(12) United States Patent  
Vicq et al.

(10) Patent No.: US 10,796,584 B2  
(45) Date of Patent: Oct. 6, 2020

(54) COMMUNICATION METHOD FOR COMMUNICATING COMPUTER DATA BETWEEN AT LEAST ONE AIRCRAFT AND AT LEAST ONE SEPARATE PIECE OF ELECTRONIC EQUIPMENT

(71) Applicant: AIRBUS HELICOPTERS, Marignane (FR)

(72) Inventors: Alexandre Vicq, Marseilles (FR); Remi Bourdillon, Velaux (FR)

(73) Assignee: AIRBUS HELICOPTERS, Marignane (FR)

( * ) Notice: Subject to any disclaimer, the term of this patent is extended or adjusted under 35 U.S.C. 154(b) by 138 days.

(21) Appl. No.: 15/921,892

(22) Filed: Mar. 15, 2018

(65) Prior Publication Data

US 2018/0268717 A1    Sep. 20, 2018

(30) Foreign Application Priority Data

Mar. 16, 2017   (FR) ...................... 17 70258

(51) Int. Cl.
   *G08G 5/00*   (2006.01)
   *G06F 9/54*   (2006.01)

(52) U.S. Cl.
   CPC ............ *G08G 5/0013* (2013.01); *G06F 9/54* (2013.01)

(58) Field of Classification Search
   CPC ................................. G08G 5/0013; G06F 9/54
   See application file for complete search history.

(56) References Cited

U.S. PATENT DOCUMENTS

| | | | |
|---|---|---|---|
| 2002/0035416 A1 | 3/2002 | De Leon | |
| 2004/0008253 A1 | 1/2004 | Monroe | |
| 2008/0150735 A1 | 6/2008 | Celauro | |
| 2016/0093124 A1 | 3/2016 | Shi et al. | |
| 2016/0272341 A1* | 9/2016 | Van Horn | B64D 45/00 |

(Continued)

FOREIGN PATENT DOCUMENTS

| | | |
|---|---|---|
| FR | 2485779 A1 | 12/1981 |
| GB | 2079978 A | 1/1982 |
| GB | 2123996 A | 2/1984 |

(Continued)

OTHER PUBLICATIONS

French Search Report for French Application No. FR 1770258, Completed by the French Patent Office, dated Nov. 30, 2017, 12 pages.

(Continued)

*Primary Examiner* — Rodney A Butler  
(74) *Attorney, Agent, or Firm* — Brooks Kushman P.C.

(57) ABSTRACT

A communication method for communicating computer data between an aircraft and a separate piece of electronic equipment. According to the invention, such a communication method comprises the following steps: a first transmission step for transmitting raw data from sensors arranged on the aircraft to a calculation device; a first decoding step for decoding the raw data and for generating decoded data; a first processing step for processing the decoded data and generating standardized data; a first storage step for storing the standardized data in a first memory; and a first utilization step enabling the separate piece of electronic equipment to utilize the standardized data contained in the first memory.

19 Claims, 5 Drawing Sheets

(56) References Cited

U.S. PATENT DOCUMENTS

2018/0281948 A1* 10/2018 Tao ..................... G05B 19/048

FOREIGN PATENT DOCUMENTS

| GB | 2127656 A | 4/1984 |
|---|---|---|
| WO | 0055770 A2 | 9/2000 |
| WO | 0055770 A3 | 9/2000 |

OTHER PUBLICATIONS

Mitchell K et al: "General Aviation Flight Operations Quality Assumace: Overcoming the Obstacles", IEEE Aerospace and Electronic Systems Magtazine, IEEE Service Center, Piscataway, NJ, US, vol. 22, No. 6, Jun. 1, 2017, pp. 9-15, XP011187236, 7 pages.
Azzam H et al: "Fums™ Fusion for Improved Aircraft MAAAP", Aerospace Conference, 2005, IEEE, IEEE, Piscataway, NJ, US, Mar. 5, 2005, pp. 1-15, XP010864494, 15 pages.

* cited by examiner

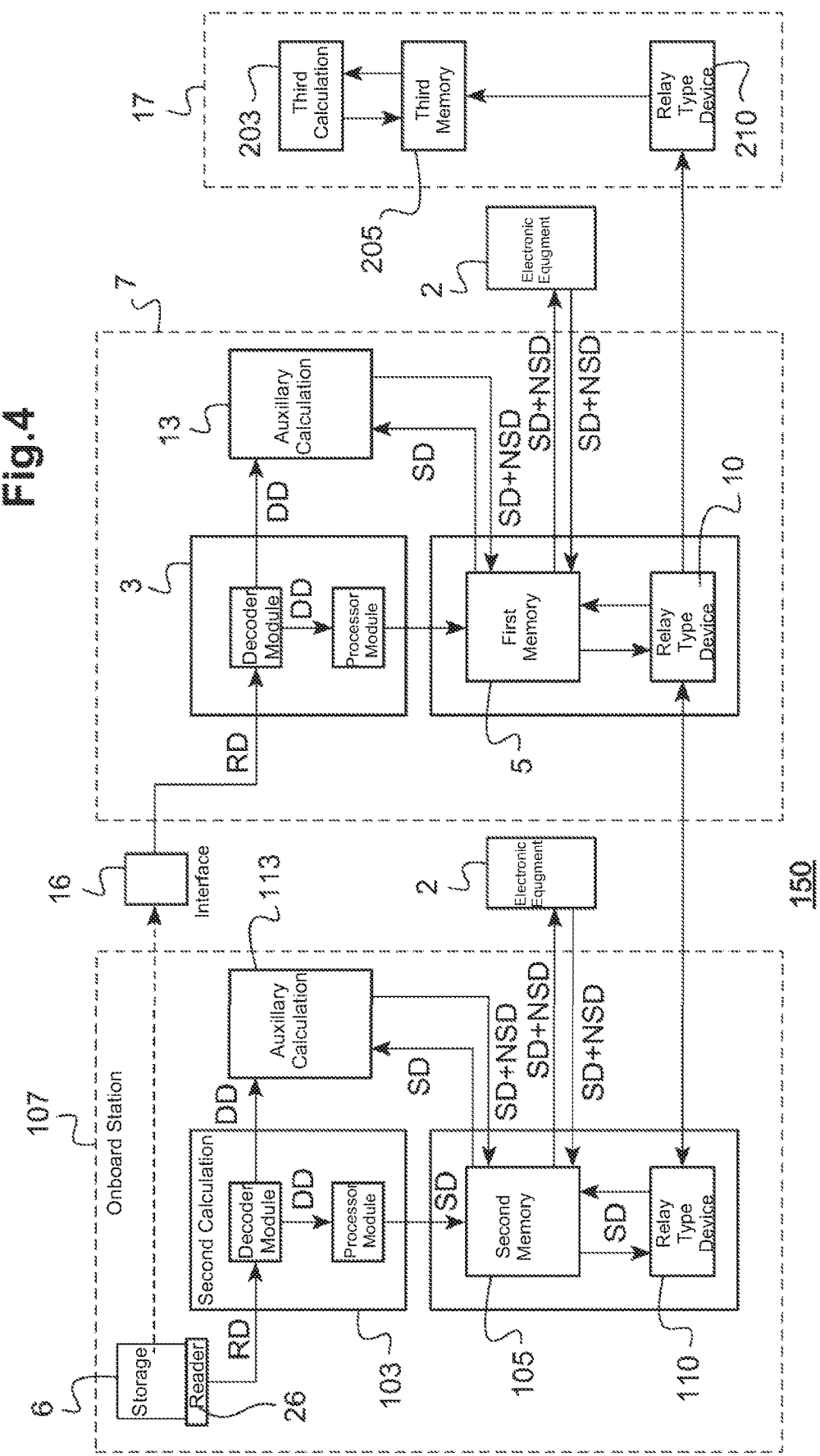

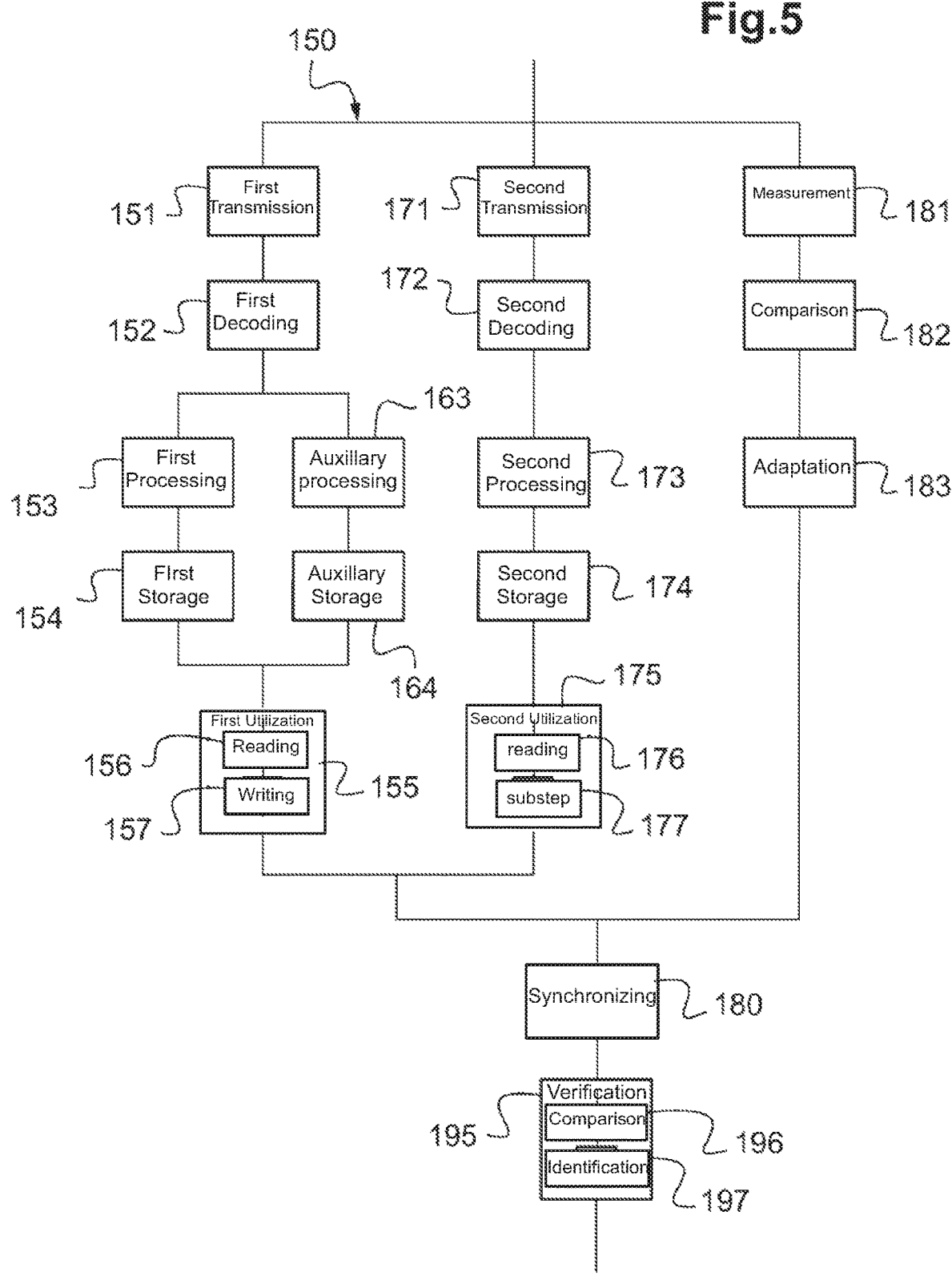

COMMUNICATION METHOD FOR COMMUNICATING COMPUTER DATA BETWEEN AT LEAST ONE AIRCRAFT AND AT LEAST ONE SEPARATE PIECE OF ELECTRONIC EQUIPMENT

CROSS-REFERENCE TO RELATED APPLICATIONS

This application claims priority to French patent application No. FR 1770258 filed on Mar. 16, 2017, the disclosure of which is incorporated in its entirety by reference herein.

BACKGROUND OF THE INVENTION

(1) Field of the Invention

The present invention relates to the field of communication methods enabling at least one aircraft to communicate computer data with at least one separate piece of electronic equipment, e.g. constituted by a server, a microcomputer, optionally a laptop, a smartphone, or a tablet, in particular. Thus, a separate piece of electronic equipment may in particular include a man/machine interface enabling the computer data to be communicated to at least one person.

2) Description of Related Art

Such computer data is generally generated in flight, or more generally during utilization of the aircraft, on the basis of sensors that measure variations in a state parameter such as the voltage or the current of an electric signal passing through the sensors. Such sensors can thus serve to take measurements of a physical parameter, such as for example variations in the position or the altitude of the aircraft, in the pressure or the temperature of a fluid flowing inside the aircraft, vibration to which a member of the aircraft is subjected, the amount of fuel present in the tank(s), etc.

These measurements constitute "avionics data" corresponding to encoded raw computer data. During utilization of the aircraft, all of this avionics data is thus recorded in a storage medium arranged on board the aircraft.

Once on the ground, the storage medium can be extracted manually from the aircraft in order to be inserted into a reader in the premises of the operator of the aircraft. Such a reader that is external to the aircraft then makes it possible a posteriori to collect all of the avionics data recorded during the flight of the aircraft. Thereafter, the avionics data needs to be decoded by specific software developed by the manufacturer of the aircraft.

In general manner, such collected avionics data is of considerable size, representing several megabytes for each hour of flight of the aircraft. Furthermore, although such avionics data can, under such circumstances, be transferred and used at least in read-only mode by a dedicated certified program or professional application that may be certified and likewise dedicated, such avionics data does not, under any circumstances, constitute standard data suitable for relating to a single physical parameter that is a function of the measurements taken by the sensor while the aircraft is in use.

It is therefore not possible for such avionics data to be recovered and used freely by a plurality of programs that have not been certified by the manufacturer of the aircraft.

Furthermore, some avionics data, e.g. such as data corresponding to the current position of the aircraft, might nevertheless be disjointly transmitted to the ground while the aircraft is in flight by a wireless data communication method.

Nevertheless, under such circumstances, the amount of information that can be transmitted is very limited. Such avionics data can thus under no circumstances be representative of all of the sensors on board the aircraft. In addition, such avionics data cannot be shared quickly between a plurality of operators, such as for example the operator of the aircraft, who may be a rental user or a proprietor of the aircraft, or indeed the manufacturer of the aircraft, and a third party, such as the manufacturer of a component of the aircraft, for example.

Furthermore, as described in Document US 2016/0093124A1, systems and methods are known for recording and analyzing data in which a platform such as an aircraft or a drone is fitted with sensors. The measurements taken by the sensors are then transmitted to a calculation and analysis unit that can store the raw and/or filtered data in a memory before or after analyzing the raw and/or filtered data.

Nevertheless, under such circumstances, the calculation unit and the memory are arranged on the platform fitted with the sensors. Thus, the raw and/or filtered data is not transmitted between the platform and a member that is disjoint from the platform prior to being analyzed.

Furthermore, Document US 2016/0093124A1 describes only a processor unit suitable for filtering the data prior to being analyzed and/or stored on the platform. Consequently, such data filtering consists in cleaning the signals delivered by sensors, which may suffer interference.

Nevertheless, under no circumstances does US 2016/0093124A1 describe any need for decoding the data coming from the sensors. Thus that document does not present a decoding step enabling decoded data to be generated that is suitable for processing.

Consequently, the filtered data is not stored in a memory that is disjoint from the platform or from a separate piece of electronic equipment.

Likewise, Document US 2002/035416 A1 describes a method of transmitting data between an aircraft and a ground station.

Nevertheless, such a method does not describe transmitting coded raw data, nor does it describe a decoding step or a step of storing in a memory that is disjoint both from the aircraft and from the ground station, nor indeed does it describe a step of the data being used by a separate piece of electronic equipment.

BRIEF SUMMARY OF THE INVENTION

An object of the present invention is thus to provide a method that enables the above-mentioned limitations to be avoided. Such a method thus makes it possible to reduce considerably the volume of computer data that is to be exchanged between the various sensors of an aircraft and at least one separate piece of electronic equipment.

Another object of the invention is to enable various operators having staff provided with separate pieces of electronic equipment to exchange standardized computer data of several kilobytes, and without requiring decoding.

Such standardized computer data can then be exchanged very quickly, and indeed almost in real time, in particular using a wireless communication protocol or a local network protocol, e.g. using an Ethernet type wired connection, directly between a separate piece of electronic equipment and an aircraft in which the standardized data SD can be stored, or indeed between a separate piece of electronic equipment and a memory constituting a unique dematerialized image of the aircraft on the basis of unique standardized data for each physical parameter measured on the aircraft, the memory then being contained in computer servers that are remote from the aircraft but connected at least temporarily to the aircraft, in particular via an Internet network.

The invention thus relates to a communication method for communicating computer data between at least one aircraft and at least one separate piece of electronic equipment.

Such a method is remarkable in that it includes the following steps:

a first transmission step for transmitting raw data RD from at least one sensor arranged on said aircraft to at least one first calculation means, the sensor(s) being suitable for detecting variations in at least one state parameter during utilization of the aircraft, the first calculation means being disjoint from the aircraft and from the separate piece(s) of electronic equipment;

a first decoding step for decoding the raw data RD and for generating decoded data DD suitable for being processed, the first decoding step being performed by the first calculation means;

a first processing step for processing the decoded data DD and generating standardized data SD suitable for being used by the separate piece(s) of electronic equipment, the first processing step being performed by the first calculation means;

a first storage step for storing the standardized data SD in at least a first memory, the first memory(ies) being disjoint from the aircraft and from the separate piece(s) of electronic equipment; and a first utilization step enabling the separate piece(s) of electronic equipment to utilize the standardized data SD contained in the first memory(ies), the first utilization step including at least one reading substep enabling the standardized data SD contained in the first memory(ies) to be read.

In other words, the transmission first step may be performed by way of example while the aircraft is on the ground by using a storage medium that may be removable or by using a connection, using a wireless communication protocol, set up between the aircraft and a computer server arranged on the ground.

The first calculation means serving to decode and process the raw data RD may thus be arranged directly on the ground in the computer server of the operator of the aircraft, thus making it possible to extract certain general data, such as for example the variations in the altitude or the GPS position of the aircraft as a function of time.

The first calculation means thus make it possible to generate standardized data SD that is decoded and not very bulky, which data is subsequently stored in the first memory(ies), likewise arranged on the ground in a computer server of the operator of the aircraft.

One or more separate pieces of electronic equipment can then make connections via a wireless communication protocol or an Ethernet type protocol connected to a network so as to use the standardized data SD contained in the first memory(ies). This communication/transfer protocol may be selected in particular from the group comprising by way of example wireless communication protocols of the Satcom, WiFi, Bluetooth, GSM, GPRS, UMTS type and/or indeed a wired communication protocol such as, in particular, Ethernet, in order to utilize a communication protocol of the TCP/IP type, in particular.

This first utilization step thus makes it possible for example for a plurality of professional applications to be developed independently by each aircraft operator or by other third parties such as manufacturers of accessories or of pieces of equipment forming parts of the aircraft. The standardized data SD contained in the first memory(ies) is freely and directly usable by professional applications used by the separate piece(s) of electronic equipment.

Advantageously, the method may include:

an auxiliary processing step for processing at least some standardized data SD stored in the first memory(ies) and/or the decoded data DD generated by the first calculation means, the auxiliary processing step serving to generate at least some new standardized data NSD suitable for being utilized by the separate piece(s) of electronic equipment, the auxiliary processing step being performed by auxiliary calculation means; and an auxiliary storage step for storing the at least some new standardized data NSD in the first memory(ies).

In other words, the new standardized data is generated no longer from raw data RD, but from standardized data stored in the first memory(ies). Under such circumstances, the first calculation means thus also make it possible to make use of various professional applications in order to read at least some of the standardized data in the first memory(ies), and then write at least some new standardized data in the first memory(ies).

In practice, the first transmission step, the first decoding step, the first processing step, and the first storage step may be performed while the aircraft is on the ground, the first calculation means and the first memory(ies) being arranged on the ground in a computer server of the operator of the aircraft.

Thus, once a mission of the aircraft has terminated, the pilot, the copilot, or any other person can then either manually remove the data medium from its reader on board the aircraft and manually insert it in a similar reader to transfer the raw data RD to the computer server installed on the ground, or else, while on the ground, the raw data can be transmitted to the computer server that is connected to an interface including a receiver module making use of a wireless communication protocol such as a Satcom, WiFi, Bluetooth, GMS, GPRS, UMTS protocol.

In an implementation of the invention, the method may include:

a second transmission step for transmitting raw data RD from the sensor(s) arranged on the aircraft to second calculation means, the second calculation means being distinct both from the first calculation means and from the separate piece(s) of electronic equipment, the second calculation means being arranged on board the aircraft;

a second decoding step for decoding the raw data RD during utilization of the aircraft and for generating decoded data DD suitable for being processed during utilization of the aircraft, the second decoding step being performed by the second calculation means during the utilization of the aircraft;

a second processing step for processing the decoded data DD and for generating standardized data SD suitable for being utilized by the separate piece(s) of electronic equipment, the second processing step being performed by the second calculation means during the utilization of the aircraft; and a second storage step for storing the standardized data SD during the utilization of the aircraft in at least one second memory, the second memory(ies) being disjoint both from the first memory(ies) and from the separate piece(s) of electronic equipment, the second memory(ies) being arranged on board the aircraft.

In other words, the standardized data SD can likewise be generated almost in "real time" by the second calculation means during utilization of the aircraft. This standardized data SD is then stored directly in the second memory(ies) fitted to the aircraft. Such utilization of the aircraft may consist in a stage of flight, but could also consist in stages of waiting or of taxiing on the ground with at least one engine of the aircraft in operation, and/or in stages of maintenance during which the engine(s) of the aircraft need not be running.

A passenger or any member of the crew of the aircraft can thus utilize a separate piece of electronic equipment directly in flight in order to perform the first step of utilizing the standardized data DS.

In an advantageous implementation, the method may include:

an auxiliary processing step for processing at least some standardized data SD stored in the first memory(ies) and/or the decoded data DD generated by the first calculation means, the auxiliary step serving to generate at least some new standardized data NSD suitable for being utilized by the separate piece(s) of electronic equipment, the auxiliary processing step being performed by auxiliary calculation means; and an auxiliary storage step for storing the at least some new standardized data NSD in the first memory(ies); and the method may include a synchronizing step of synchronizing the standardized data SD and the new standardized data NSD stored firstly in the first memory(ies) and secondly in the second memory(ies), the synchronizing step serving to copy at least part of the standardized data SD and of the new standardized data NSD contained in the first memory(ies) to the second memory(ies), and vice versa.

Thus, e.g. via an http server, the synchronizing step makes it possible to utilize web services "REST" type mechanisms enabling synchronous type spot reads and writes. Asynchronous type subscription and reception of changes in the standardized data SD contained in one or other of the first and second memories then takes place via a network communication protocol, e.g. of the "websockets" type, in order to replicate all of the modifications made on one or another of the first and second memories. The various partners, such as the operator of the aircraft, the manufacturer of the aircraft, or indeed the manufacturer of a particular member, can thus freely share their standardized data SD with one another.

Such a synchronizing step may naturally be performed while the aircraft is standing on the ground.

Nevertheless, in advantageous manner, the synchronizing step may be performed by means of at least one wireless communication protocol during the utilization of the aircraft.

In any event, any writing in the second memory(ies) can automatically be transmitted to the ground into the first memory(ies). The wireless communication protocol(s) may be selected from the group comprising the following protocols: Satcom, WiFi, GSM, GPRS, and UMTS.

A device of the "relay" type is then connected to the second memory(ies) and acts in real time to monitor all updating of the standardized data DS. The standardized data SD transmitted to the ground is then of very limited size since it is representative solely of the updating that has just taken place.

The selected standardized data SD is thus sent by the relay type device of the aircraft to another relay type device located on the ground and enabling an image of the standardized data SD contained in the second memory(ies) to be reconstituted in the first memory(ies).

In practice, the method may include:

a measurement step for measuring a passband of the wireless communication protocol(s) enabling the standardized data SD and the new standardized data NSD stored in the second memory(ies) to be synchronized to the first memory(ies);

a comparison step for comparing the measured bandwidth with predetermined threshold values; and an adaptation step for adapting a quantity of standardized data SD and of new standardized data NSD for transmission to the first memory(ies), the quantity of standardized data SD and of new standardized data NSD being a function of a result of the comparison between the measured bandwidth and the predetermined threshold values.

Such bandwidth measurement then makes it possible automatically to modify the volume of standardized data SD that is sent to the ground, e.g. as a function of the type of mission of the aircraft and of the coverage of the wireless communication protocol(s). Thus, a high level of priority may be given to some of the standardized data SD and to some of the new standardized data NSD as a function of the mission of the aircraft.

Such standardized data SD and new standardized data NSD can then be transmitted to the ground on a priority basis, while other standardized data SD or new standardized data NSD of lower priority may be transmitted subsequently after all of the high-priority standardized data SD and new standardized data NSD has been transmitted to the ground, or only when the bandwidth of the wireless communication protocol(s) has gone back to being greater than a predetermined threshold value.

In an implementation of the invention, the method may include:

an auxiliary processing step for processing at least some standardized data SD stored in the first memory(ies) and/or the decoded data DD generated by the first calculation means, the auxiliary processing step serving to generate at least some new standardized data NSD suitable for utilization by the separate piece(s) of electronic equipment, the auxiliary processing step being performed by auxiliary calculation means; and an auxiliary storage step for storing the at least some new standardized data NSD in the first memory(ies); and the method may include a second utilization step enabling the separate piece(s) of electronic equipment to utilize the standardized data SD and the new standardized data NSD contained in the second memory(ies), the second utilization step including at least one reading substep enabling the standardized data SD and the new standardized data NSD contained in the second memory(ies) to be read.

In other words, a passenger or a member of the crew of the aircraft can utilize one or more separate pieces of electronic equipment, e.g. in flight, in order to read the standardized data SD contained in the second memory(ies). To do this, the communication/transfer protocols are used for the standardized data SD and may include in particular a wireless communication protocol that may advantageously be selected from the group comprising the WiFi or Bluetooth protocols in particular, and/or indeed a wired communication protocol such as Ethernet in particular, for enabling a communication protocol of the TCP/IP type in particular to be utilized.

Advantageously, at least one of the first and second utilization steps may include a writing substep enabling at least some new standardized data NSD to be written in at least one of the first and second memory(ies).

Thus, the separate piece(s) of electronic equipment may likewise serve to generate new standardized data NSD and then store it in the first memory(ies) or in the second memory(ies). Specifically, such separate pieces of electronic equipment have calculation capacity suitable for performing algorithms of professional applications as also performed by the first calculation means or the second calculation means.

In practice, the method may include a verification step comprising:

a comparison substep for comparing the new standardized data NSD with the raw data RD and/or with the standardized data SD stored in at least one of the first and second memory(ies); and an identification substep for identifying any inconsistency between the new standardized data NSD and the raw data RD and/or the standardized data SD stored in at least one of the first and second memory(ies).

In other words, and by way of example, when new standardized data NSD generated by a separate piece of electronic equipment is inconsistent with some other standardized data SD generated by the first calculation means or by the second calculation means, then an alert message may be generated and transmitted to a member of the crew of the aircraft, such as in particular the pilot or the copilot, and/or to a person on the ground, e.g. concerned with preparing a flight of the aircraft or with its maintenance.

Such an alert message may thus request the crew to proceed with new acquisition of at least some of the new standardized data, e.g. during a procedure for verifying the aircraft prior to a mission.

BRIEF DESCRIPTION OF THE DRAWINGS

The invention and its advantages appear in greater detail in the context of the following description of embodiments given by way of illustration and with reference to the accompanying figures, in which:

FIG. 4 is a block diagram showing the second variant of the method in accordance with the invention; and FIG. 5 is a flow chart showing the steps performed in the second variant of the method in accordance with the invention.

DETAILED DESCRIPTION OF THE INVENTION

Elements present in more than one of the figures may be given the same references in each of them.

As mentioned above, the invention relates to a method of communication for communicating computer data between at least one aircraft and at least one separate piece of electronic equipment.

Figure 1:
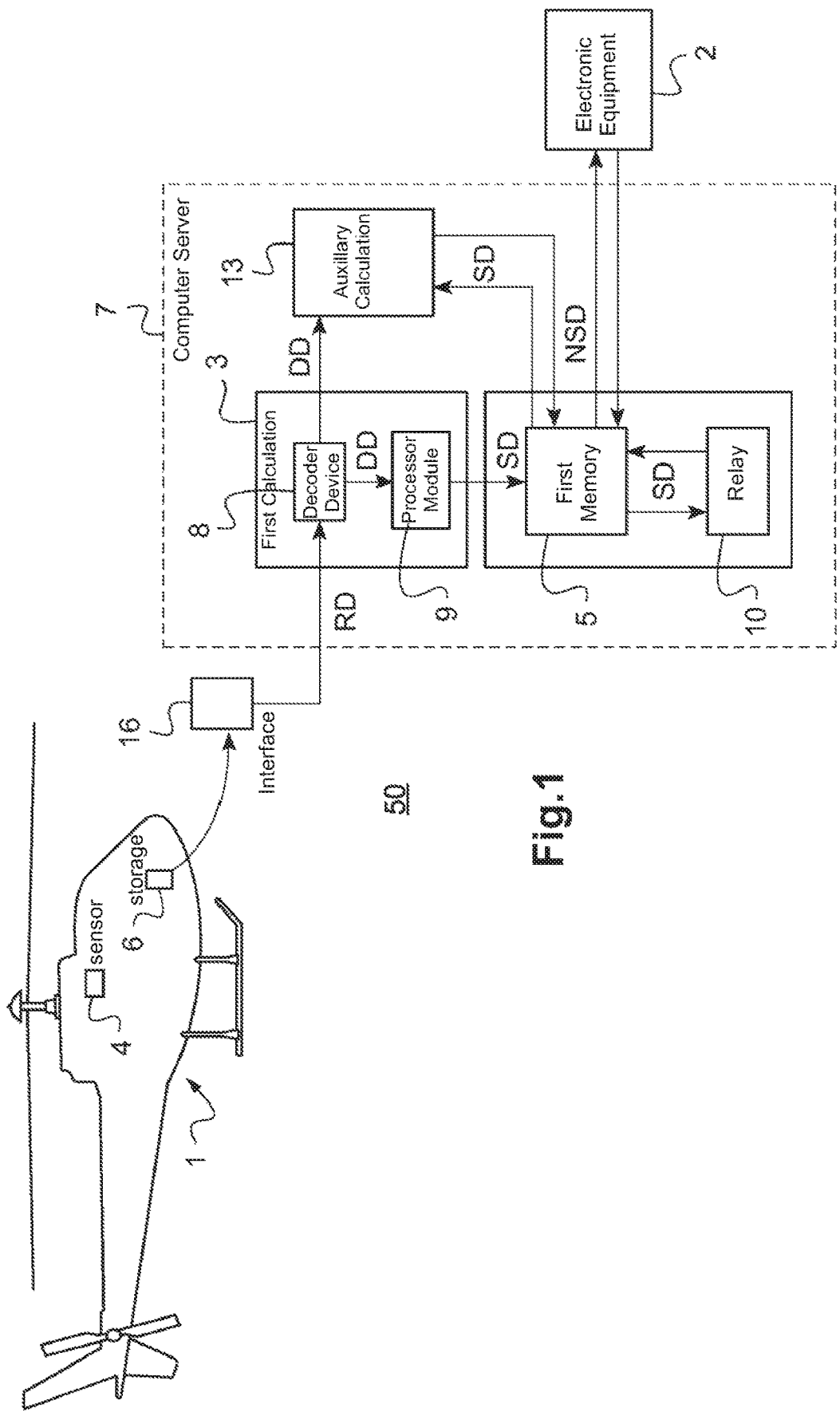
FIG. 1 is a block diagram showing a first variant of the method in accordance with the invention.

Thus, in a first variant of the communication method as shown in FIG. 1, the communication method 50 enables computer data to be communicated between firstly an aircraft 1, shown in the figure in the form of a rotorcraft, and at least one separate piece of electronic equipment 2.

In accordance with this first variant of the method 50, the aircraft 1 has at least one sensor 4 suitable for detecting variations in a state parameter during a stage of flight of the aircraft 1. The computer data from the sensor 4 is then stored in flight on a storage medium 6.

Once on the ground, the storage medium 6 can be extracted from the aircraft 1 and inserted into an interface 16 formed by a reader that is complementary to the storage medium and connected to a computer server 7 that is arranged on the ground. Such an interface 16 thus serves at least to read the computer data previously stored on board the aircraft 1 during a stage of utilization of the aircraft. In another example, the storage medium 6 may equally well remain on board an aircraft that has wireless communication means for transmitting the raw data RD to an interface 16, which is then formed by a receiver module of the Satcom, WiFi, Bluetooth, GSM, GPRS, or UMTS type, and which is connected in particular to the computer server 7.

At this stage, the computer data read or collected by the interface 16 is in the form of raw data RD and it is transmitted directly to at least first calculation means 3.

Such first calculation means 3 comprises computer means serving in particular to perform calculations and comparisons on the basis of the computer data it receives. Thus, by way of example, such first calculation means 3 may comprise a processor, an integrated circuit, a programmable system, a logic circuit, these examples not limiting the scope to be given to the term "first calculation means".

A decoder module 8 of the first calculation means 3 then serves to generate decoded data DD from the raw data RD. A processor module 9 of the first calculation means 3 then serves to generate standardized data SD from the decoded data DD.

Simultaneously, some of the decoded data DD may also be transmitted to auxiliary calculation means 13 serving to generate other standardized data DS. Such auxiliary calculation means 13 may serve in particular to manage algorithms of one or more professional applications that may be developed by third parties, such as for example the operator of the aircraft or the manufacturer of a component of the aircraft 1.

The standardized data SD generated by the processor module or by the auxiliary calculation means 13 is subsequently transmitted to a first memory 5 in order to be stored and enable at least some of the standardized data SD to be used subsequently.

A separate piece of electronic equipment 2 is also connected to the first memory 5, e.g. by means of a wireless communication protocol, in particular of the WiFi or Bluetooth type.

Such a separate piece of electronic equipment 2 can thus read standardized data SD and new standardized data NSD contained in the first memory 5 and can in turn write new standardized data NSD in this first memory 5.

For example, an alert message may be generated by the auxiliary calculation means 13 in the form of new standardized data NSD and it may be transmitted to the first memory 5. The alert message can then be called automatically in asynchronous manner by the separate piece of electronic equipment 2 on request of its user.

Furthermore, a relay type device 10 may also receive from the first memory 5 only updates of the standardized data SD and of the new standardized data NSD that it contains. These updates can then be transmitted to another relay type device (not shown in FIG. 1) in order to replicate the content of the first memory 5 in another memory remote from the computer server 7 arranged on the ground.

Communication between two relay type devices then takes place via communication network, in particular such as the Internet.

Figure 2:
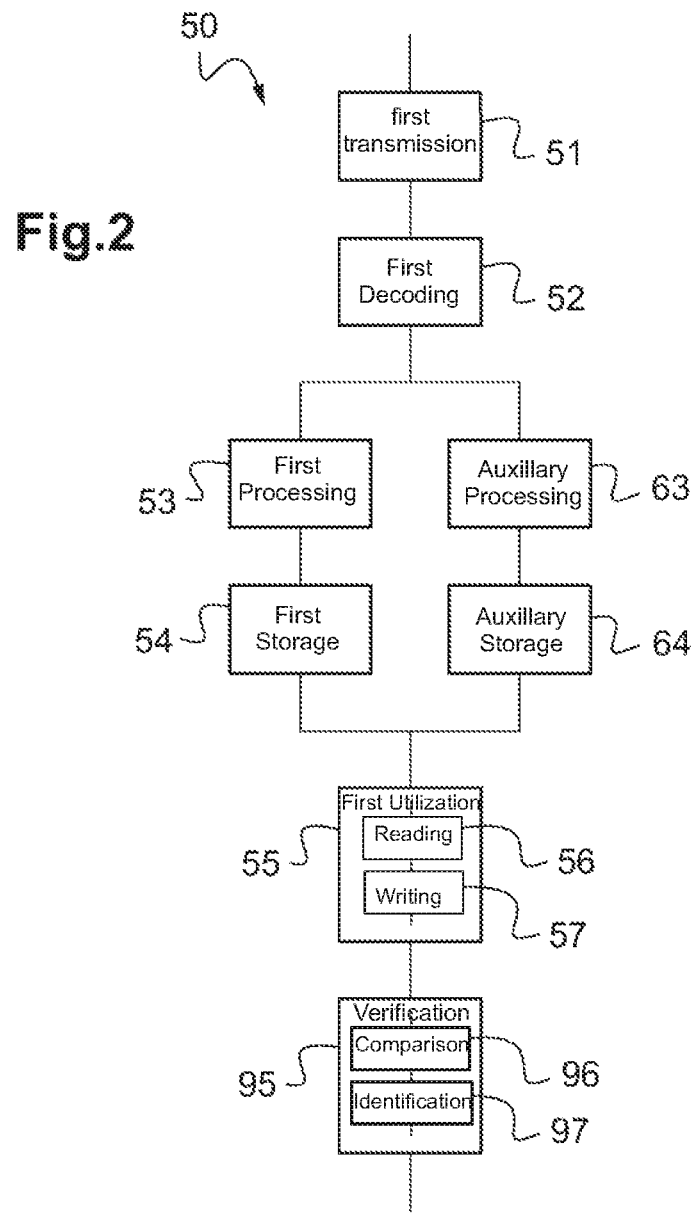
FIG. 2 is a flow chart showing the steps performed in the first variant of the method in accordance with the invention.

As shown in FIG. 2, this first variant of the communication method 50 thus includes a first transmission step 51 for transmitting raw data RD from the sensor 4 on board the aircraft 1 to the first calculation means 3.

Thereafter, the communication method 50 includes a first decoding step 52 for decoding the raw data RD and for generating decoded data DD suitable for being processed. This first decoding step 52 is performed by the first calculation means 3.

Furthermore, the communication method 50 includes a first processing step 53 for processing the decoded data DD and for generating standardized data SD suitable for being used by the separate piece(s) of electronic equipment 2. Such a first processing step 53 is likewise performed by the first calculation means 3.

The communication method 50 then includes a first storage step 54 for storing the standardized data SD in the first memory 5.

As mentioned above, in parallel with the first processing steps 53 and the first storage steps 54, the communication method 50 may include an auxiliary processing step 63 for processing at least some of the standardized data SD stored in the first memory 5 and/or some of the decoded data DD generated by the first calculation means 3.

This auxiliary processing step 63 thus serves to generate at least some new standardized data NSD suitable for being used by the separate piece(s) of electronic equipment 2. Furthermore, such an auxiliary processing step 63 is performed by the auxiliary calculation means 13.

Still in parallel with the first processing step 53 and the first storage step 54, the communication method 50 may then include an auxiliary storage step 64 for storing the new standardized data NSD in the first memory 5.

Thereafter, the method 50 includes a first utilization step 55 enabling the separate piece(s) of electronic equipment 2 to make use of the standardized data SD and of the new standardized data NSD contained in the first memory 5, e.g. by means of a wireless communication protocol.

Furthermore, this first utilization step 55 includes at least one reading substep 56 for reading the standardized data SD and the new standardized data NSD contained in the first memory 5.

Finally, the communication method 50 includes a verification step 95 including:

a comparison substep 96 serving to compare the new standardized data NSD generated by the auxiliary calculation means 13 with the raw data RD (and/or the standardized data DS) stored in the first memory 5; and an identification substep 97 serving to identify any inconsistency between the new standardized data NSD and the raw data RD and/or the standardized data SD stored in the first memory 5.

Figure 3:
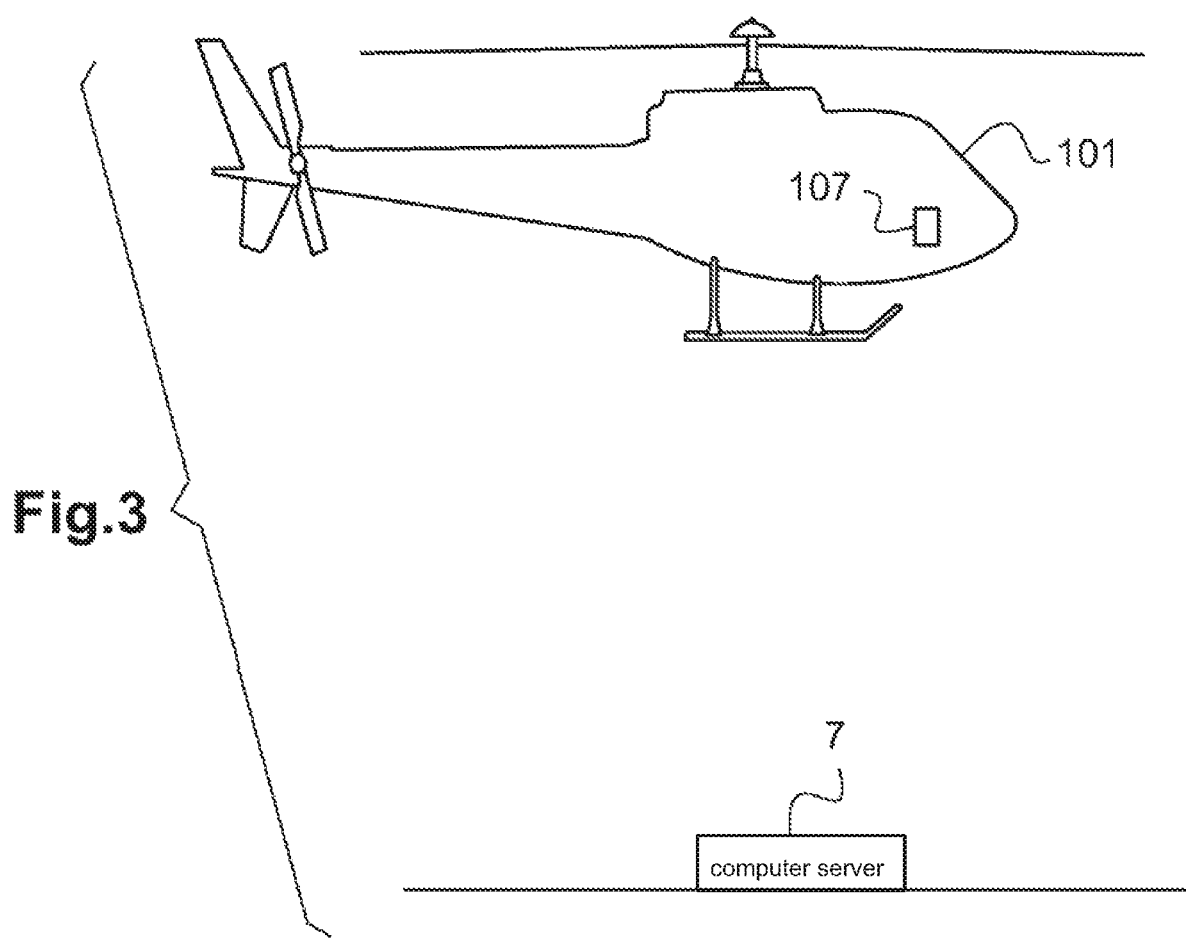
FIG. 3 is a side view showing an aircraft and a computer server arranged on the ground suitable for communicating computer data with each other using a second variant of the method in accordance with the invention.

In the second variant of the invention and as shown in FIG. 3, an aircraft 101 may equally well be fitted with an onboard station 107 suitable for using a wireless communication protocol to communicate with a computer server 7 arranged on the ground and of the kind described above with reference to FIG. 1. Such a wireless communication protocol may in particular be selected from the group comprising the following protocols: Satcom; WiFi; GSM; GPRS; and UMTS.

As shown in FIG. 4, and in a second variant of the invention corresponding to a communication protocol 150, the aircraft 101 has a reader 26 serving at least to read almost instantaneously the computer data stored on the storage medium 6 during a stage of utilization of the aircraft 101.

The reader 26 is then integrated in an onboard station 107 of the aircraft 101 and serves to receive the raw data RD from the sensor(s) 4 in real time. Such an onboard station 107 includes second calculation means 103 suitable for performing the same functions as the first calculation means 3, a second memory 105 suitable for performing the same functions a the first memory 5, and auxiliary calculation means 113 suitable for performing the same functions as the auxiliary calculation means 13.

The onboard station 107 also has a relay type device 110 serving to use a wireless communication protocol to transmit only updates to the standardized data SD to the relay type device 10. This transmission of updates can then take place from the first memory 5 to the second memory 105, or conversely from the second memory 105 to the first memory 5.

Furthermore, another computer server 17 arranged on the ground may also be connected to the computer server 7 and may include another relay type device 210 for receiving the updates to the standardized data SD made in one or the other of the first and second memories 5 and 105. Such updates are then stored in a third memory 205 of the other computer server 17.

Finally, the computer server 17 may also include third calculation means 203 suitable for reading and using the standardized data SD contained in the third memory 205, optionally in order to generate new standardized data.

In practice, such a computer server 17 may be installed on the premises of the manufacturer of the aircraft 101 or of a third party, such as for example the manufacturer of equipment fitted to the aircraft 101.

As shown in FIG. 5, the second variant of the communication method 150 includes the steps described for the first variant of the communication method 50, namely: a first transmission step 151, a first decoding step 152, a first processing step 153, a first storage step 154, and a first utilization step 155 formed via the computer server 7 and one or more separate pieces of electronic equipment 2.

Furthermore, the communication method 150 includes a second transmission step 171 for transmitting the raw data RD from the sensor 4 to at least the second calculation means 103. The second calculation means 103 are distinct from the first calculation means 3 and from the separate piece(s) of electronic equipment 2.

In addition, the communication method 150 includes a second decoding step 172 for decoding the raw data RD while the aircraft 101 is being utilized and for generating almost instantaneously decoded data DD that is suitable for being processed while the aircraft is being utilized. This second decoding step 172 can thus be performed in flight by the second calculation means 103.

Thereafter, the communication method 150 also includes a second processing step 173 for processing the decoded data DD and for generating standardized data SD suitable for being utilized by the separate piece(s) of electronic equipment 2. This second processing step 173 may thus likewise be performed in flight by the second calculation means 103.

Thereafter, the communication method 150 includes a second storage step 174 for storing the standardized data SD in the second memory 105 on board the aircraft 101. This second memory 105 is thus disjoint both from the first memory 5 and also from the separate piece(s) of electronic equipment 2.

The communication method 150 then includes a second utilization step 175 that enables a separate piece of electronic equipment 2 to use the standardized data SD and the new standardized data NSD contained in the second memory 105. This second utilization step 175 includes a reading substep 176 enabling the standardized data SD and the new standardized data NSD contained in the second memory 105 to be read, and a writing substep 177 enabling at least some new standardized data NSD to be written into the second memory 105.

In parallel with these steps 151 to 155 and 171 to 175, the communication method 150 may also include a measurement step 181 for measuring the bandwidth of the wireless communication protocol enabling the standardized data SD and the new standardized data NSD stored in the second memory 105 of the onboard station 107 to be synchronized with the first memory 5 of the computer server 7 on the ground.

Thereafter, the communication method 150 then includes a comparison step 182 for comparing the measured bandwidth with predetermined threshold values, and an adaptation step 183 of adapting a quantity of standardized data SD and of new standardized data NSD for transmission to the first memory 5. In addition, the quantity of standardized data SD and of new standardized data NSD is determined as a function of a result of a comparison between the measured bandwidth and the predetermined threshold value.

The communication method 150 also includes a synchronizing step 180 of synchronizing the standardized data SD and the new standardized data NSD stored firstly in the first memory 5 and secondly in the second memory 105. Such a synchronizing step 180 thus makes it possible to act instantaneously to make an at least partial copy of the standardized data SD and of the new standardized data NSD contained in the first memory 5 to the second memory 105, and conversely of the standardized data SD and the new standardized data NSD contained in the second memory 105 to the first memory 5.

Finally, the communication method 150 includes a verification step 195 comprising:
a comparison substep 196 serving to compare the new standardized data NSD generated by one of the auxiliary calculation means 13 and 113 with the raw data RD and/or with the standardized data SD stored in either one of the first and second memories 5 and 105; and
an identification substep 197 serving to identify any inconsistency between the new standardized data NSD and the raw data RD and/or the standardized data SD stored in either one of the first and second memories 5 and 105.

It thus appears from the above that a communication method in accordance with the invention is particularly advantageous in that it makes it possible specifically for the operator of a fleet of aircraft to perform analyses on the basis of standardized data SD and of new standardized data NSD coming from the fleet of aircraft. Such aircraft may in particular be of the same type or they may be of different types.

Naturally, the present invention may be subjected to numerous variations as to its implementation. Although several implementations are described, it will readily be understood that it is not conceivable to identify exhaustively all possible implementations. It is naturally possible to envisage replacing any of the means described with equivalent means without thereby going beyond the ambit of the present invention.

What is claimed is:

1. A communication method for communicating computer data between at least one aircraft and at least one separate piece of electronic equipment, the communication method comprising the following steps:
a first transmission step for transmitting raw data from at least one sensor arranged on the aircraft to at least one first calculation device, the sensor(s) being suitable for detecting variations in at least one state parameter during utilization of the aircraft, the first calculation device being disjoint from the aircraft and from the separate piece(s) of electronic equipment;
a first decoding step for decoding the raw data and for generating decoded data suitable for being processed, the first decoding step being performed by the first calculation device;
a first processing step for processing the decoded data and generating standardized data suitable for being used by the separate piece(s) of electronic equipment, the first processing step being performed by the first calculation device;
a first storage step for storing the standardized data in at least a first memory, the first memory being disjoint from the aircraft and from the separate piece(s) of electronic equipment; and
a first utilization step enabling the separate piece(s) of electronic equipment to utilize the standardized data contained in the first memory, the first utilization step including at least one reading substep enabling the standardized data contained in the first memory to be read.

2. The method according to claim 1, further comprising:
an auxiliary processing step for processing at least some standardized data stored in the first memory and/or the decoded data generated by the first calculation device, the auxiliary processing step serving to generate at least some new standardized data suitable for being utilized by the separate piece(s) of electronic equipment, the auxiliary processing step being performed by auxiliary calculation device; and
an auxiliary storage step for storing the at least some new standardized data in the first memory.

3. The method according to claim 1, wherein the first transmission step, the first decoding step, the first processing step, and the first storage step are performed while the aircraft is on the ground, the first calculation device and the first memory being arranged on the ground in a computer server of an operator of the aircraft.

4. The method according to claim 1, further comprising:
a second transmission step for transmitting raw data from the sensor(s) arranged on the aircraft to second calculation device, the second calculation device being distinct both from the first calculation device and from the separate piece(s) of electronic equipment, the second calculation device being arranged on board the aircraft;
a second decoding step for decoding the raw data during utilization of the aircraft and for generating decoded data suitable for being processed during utilization of the aircraft, the second decoding step being performed by the second calculation device during utilization of the aircraft;
a second processing step for processing the decoded data and for generating standardized data suitable for being utilized by the separate piece(s) of electronic equipment, the second processing step being performed by the second calculation device during utilization of the aircraft; and a second storage for storing the standardized data during utilization of the aircraft in at least one second memory, the second memory being disjoint both from the first memory and from the separate piece(s) of electronic equipment, the second memory being arranged on board the aircraft.

5. The method according to claim 4, wherein further comprising:
an auxiliary processing step for processing at least some standardized data stored in the first memory and/or the decoded data generated by the first calculation device, the auxiliary processing step serving to generate at least some new standardized data suitable for being utilized by the separate piece(s) of electronic equipment, the auxiliary processing step being performed by auxiliary calculation device; and
an auxiliary storage step for storing the at least some new standardized data in the first memory; and
a synchronizing step of synchronizing the standardized data and the new standardized data stored firstly in the first memory and secondly in the second memory, the synchronizing step serving to copy at least part of the standardized data and of the new standardized data contained in the first memory to the second memory, and vice versa.

6. The method according to claim 5, wherein the synchronizing step is performed during the utilization of the aircraft with at least one wireless communication protocol.

7. The method according to claim 6, further comprising:
a measurement step for measuring a passband of the wireless communication protocol(s) enabling the standardized data and the new standardized data stored in the second memory to be synchronized to the first memory;
a comparison step for comparing measured bandwidth with predetermined threshold values; and
an adaptation step for adapting a quantity of standardized data and of new standardized data for transmission to the first memory, the quantity of standardized data and of new standardized data being a function of a result of the comparison between the measured bandwidth and the predetermined threshold values.

8. The method according to claim 4, further comprising
an auxiliary processing step for processing at least some standardized data stored in the first memory and/or the decoded data generated by the first calculation device, the auxiliary processing step serving to generate at least some new standardized data suitable for utilization by the separate piece(s) of electronic equipment, the auxiliary processing step being performed by auxiliary calculation device; and
an auxiliary storage step for storing the at least some new standardized data in the first memory; and
a second utilization step enabling the separate piece(s) of electronic equipment to utilize the standardized data and the new standardized data contained in the second memory, the second utilization step including at least one reading substep enabling the standardized data and the new standardized data contained in the second memory to be read.

9. The method according to claim 8, wherein at least one of the first utilization step and the second utilization step includes a writing substep enabling at least some new standardized data to be written in at least one of the first memory and second memory.

10. The method according to claim 9, further comprising a verification step comprising:
a comparison substep for comparing the at least some new standardized data with the raw data and/or with the standardized data stored in at least one of the first memory and second memory; and
an identification substep for identifying any inconsistency between the at least some new standardized data and the raw data and/or the standardized data stored in at least one of the first memory and second memory.

11. A communication method for communicating computer data between at least one aircraft and at least one separate piece of electronic equipment, the communication method comprising the following steps:
a first transmission step for transmitting raw data from at least one sensor arranged on the aircraft to at least one first calculation device, the sensor(s) being suitable for detecting variations in at least one state parameter during utilization of the aircraft, the first calculation device being disjoint from the aircraft and from the separate piece(s) of electronic equipment;
a first decoding step for decoding the raw data and for generating decoded data suitable for being processed, the first decoding step being performed by the first calculation device;
a first processing step for processing the decoded data and generating standardized data suitable for being used by the separate piece(s) of electronic equipment, the first processing step being performed by the first calculation device;
a first storage step for storing the standardized data in at least a first memory, the first memory being disjoint from the aircraft and from the separate piece(s) of electronic equipment;
a first utilization step enabling the separate piece(s) of electronic equipment to utilize the standardized data contained in the first memory, the first utilization step including at least one reading substep enabling the standardized data contained in the first memory to be read;
a second transmission step for transmitting raw data from the sensor(s) arranged on the aircraft to second calculation device, the second calculation device being distinct both from the first calculation device and from the separate piece(s) of electronic equipment, the second calculation device being arranged on board the aircraft;
a second decoding step for decoding the raw data during utilization of the aircraft and for generating decoded data suitable for being processed during utilization of the aircraft, the second decoding step being performed by the second calculation device during utilization of the aircraft;
a second processing step for processing the decoded data and for generating standardized data suitable for being utilized by the separate piece(s) of electronic equipment, the second processing step being performed by the second calculation device during utilization of the aircraft; and
a second storage for storing the standardized data during utilization of the aircraft in at least one second memory, the second memory being disjoint both from the first memory and from the separate piece(s) of electronic equipment, the second memory being arranged on board the aircraft.

12. The method according to claim 11, further comprising:
an auxiliary processing step for processing at least some standardized data stored in the first memory and/or the decoded data generated by the first calculation device, the auxiliary processing step serving to generate at least some new standardized data suitable for being utilized by the separate piece(s) of electronic equipment, the auxiliary processing step being performed by auxiliary calculation device; and an auxiliary storage step for storing the at least some new standardized data in the first memory.

13. The method according to claim 11, wherein the first transmission step, the first decoding step, the first processing step, and the first storage step are performed while the aircraft is on the ground, the first calculation device and the first memory being arranged on the ground in a computer server of an operator of the aircraft.

14. The method according to claim 11, wherein further comprising:
   an auxiliary processing step for processing at least some standardized data stored in the first memory and/or the decoded data generated by the first calculation device, the auxiliary processing step serving to generate at least some new standardized data suitable for being utilized by the separate piece(s) of electronic equipment, the auxiliary processing step being performed by auxiliary calculation device; and
   an auxiliary storage step for storing the at least some new standardized data in the first memory; and
   a synchronizing step of synchronizing the standardized data and the new standardized data stored firstly in the first memory and secondly in the second memory, the synchronizing step serving to copy at least part of the standardized data and of the new standardized data contained in the first memory to the second memory, and vice versa.

15. The method according to claim 14, wherein the synchronizing step is performed during the utilization of the aircraft with at least one wireless communication protocol.

16. The method according to claim 15, further comprising:
   a measurement step for measuring a passband of the wireless communication protocol(s) enabling the standardized data and the new standardized data stored in the second memory to be synchronized to the first memory;
   a comparison step for comparing measured bandwidth with predetermined threshold values; and
   an adaptation step for adapting a quantity of standardized data and of new standardized data for transmission to the first memory, the quantity of standardized data and of new standardized data being a function of a result of the comparison between the measured bandwidth and the predetermined threshold values.

17. The method according to claim 11, further comprising
   an auxiliary processing step for processing at least some standardized data stored in the first memory and/or the decoded data generated by the first calculation device, the auxiliary processing step serving to generate at least some new standardized data suitable for utilization by the separate piece(s) of electronic equipment, the auxiliary processing step being performed by auxiliary calculation device; and
   an auxiliary storage step for storing the at least some new standardized data in the first memory; and
   a second utilization step enabling the separate piece(s) of electronic equipment to utilize the standardized data and the new standardized data contained in the second memory, the second utilization step including at least one reading substep enabling the standardized data and the new standardized data contained in the second memory to be read.

18. The method according to claim 17, wherein at least one of the first utilization step and the second utilization step includes a writing substep enabling at least some new standardized data to be written in at least one of the first memory and second memory.

19. The method according to claim 18, further comprising a verification step comprising:
   a comparison substep for comparing the at least some new standardized data with the raw data and/or with the standardized data stored in at least one of the first memory and second memory; and
   an identification substep for identifying any inconsistency between the at least some new standardized data and the raw data and/or the standardized data stored in at least one of the first memory and second memory.

* * * * *